(12) United States Patent
Ejzak et al.

(10) Patent No.: US 8,588,791 B2
(45) Date of Patent: Nov. 19, 2013

(54) METHOD FOR PROVIDING IMS SUPPORT FOR ENTERPRISE PBX USERS

(75) Inventors: Richard P. Ejzak, Wheaton, IL (US); Hong Xie, Lisle, IL (US)

(73) Assignee: Alcatel Lucent, Paris (FR)

(*) Notice: Subject to any disclaimer, the term of this patent is extended or adjusted under 35 U.S.C. 154(b) by 1106 days.

(21) Appl. No.: 12/235,680

(22) Filed: Sep. 23, 2008

(65) Prior Publication Data

US 2010/0075642 A1 Mar. 25, 2010

(51) Int. Cl.
*H04W 40/00* (2009.01)
(52) U.S. Cl.
USPC ............... 455/445; 455/432.1; 455/432.2; 455/432.3; 455/433; 455/435.1; 370/350; 370/351; 370/392; 370/395.1; 370/420
(58) Field of Classification Search
USPC ............. 455/432.1, 432.2, 432.3, 433, 435.1, 455/445; 370/350, 351, 392, 395.31, 420, 370/395.1
See application file for complete search history.

(56) References Cited

U.S. PATENT DOCUMENTS

| | | | |
|---|---|---|---|
| 7,787,878 B2 * | 8/2010 | Li et al. ............... | 455/432.1 |
| 2005/0002381 A1 * | 1/2005 | Westman et al. ......... | 370/352 |
| 2009/0185523 A1 * | 7/2009 | Allen et al. ............ | 370/328 |
| 2009/0191873 A1 * | 7/2009 | Siegel et al. ........... | 455/435.2 |

* cited by examiner

*Primary Examiner* — Nimesh Patel
*Assistant Examiner* — Thai Vu
(74) *Attorney, Agent, or Firm* — Fay Sharpe LLP

(57) ABSTRACT

An architecture and procedures by which an NGN can provide the following capabilities to an NGCN user: basic terminating service in the peering model; enhanced terminating services in the peering model; enhanced originating services in the peering model; and roaming service in the subscription and peering models. All capabilities are provided in an easily scalable manner via provisioned subscriber data and small modifications to existing IMS procedures. In the first case, an NGN is configured among the external networks to receive all SIP requests intended for the NGCN users of an NGCN interconnected to the NGN via the peering model (this NGN is the trunking home NGN), and the NGN forwards these requests to the NGCN for handling using request retargeting. In the second case, an NGN is configured among the external networks to receive all SIP requests intended for the NGCN users of an NGCN interconnected to the NGN via the peering model, and the NGN applies a set of agreed services using NGN ASs (application servers) to each request before forwarding to the NGCN for handling. In the third case, the NGCN is configured to forward all originating requests to an NGN (the trunking home NGN) via the peering model, and the NGN applies a set of agreed services using NGN ASs to each request before forwarding to the intended recipient. In the fourth case, an NGN is configured among the external networks as the roaming home NGN to receive a SIP REGISTER request from an NGCN user that has roaming capability, and the NGN forwards that request to the NGCN for handling.

8 Claims, 13 Drawing Sheets

FIG. 8 (Continued from FIG. 7)

FIG. 9 (Continued from FIG. 7)

METHOD FOR PROVIDING IMS SUPPORT FOR ENTERPRISE PBX USERS

BACKGROUND OF THE INVENTION

This invention relates to a method for IMS (Internet Protocol Multimedia Subsystem) support for enterprise PBX (Private Branch Exchange) user roaming, originations and terminations. While the invention is particularly directed to the art of telecommunications, and will be thus described with specific reference thereto, it will be appreciated that the invention may have usefulness in other fields and applications.

By way of background, there has been considerable work done in TISPAN (Telecoms & Internet converged Services & Protocols for Advanced Networks) and 3GPP (3rd Generation Partnership Project) to specify how to support NGCN (Next Generation Corporate Network) users within an NGN (Next Generation Network). An NGN is an operator network based on IMS. Each NGCN is comprised of one or more IP (Internet Protocol) PBX systems with IP interconnect to an NGN, which is normally referred to as business trunking or SIP trunking.

Currently, there are two NGCN/NGN interconnect models—the subscription model and the peering model. In the subscription model, the NGCN interconnects to the NGN via the Gm reference point (a SIP-based reference point normally shown between the user equipment (UE) and the Proxy-Call Session Control Function (P-CSCF)). The NGCN registers into the NGN on behalf of all NGCN users, which receive some services from their NGCN as well as receiving other services from the NGN IMS (IP Multimedia Subsystem) according to the provisioned application servers and filter criteria. The subscription model clearly defines how the NGN provides basic call originating and terminating services plus enhanced originating and terminating services to the NGCN users. There is currently no agreed standard for how the NGN in the subscription model provides roaming service to an NGCN user. In the peering model, the NGCN interconnects to the NGN via an inter-IMS interface (typically via an Interconnect Border Control Function (IBCF)) but does not register into the NGN on behalf of its users. The peering model clearly defines how the NGN provides basic transit/routing services for SIP requests originating in the NGCN. There is currently no agreed standard for how the NGN in the peering model provides basic terminating service, enhanced originating or terminating services, or roaming service to an NGCN user.

It is evident that there is a need for the NGN to provide various capabilities, including (1) basic call terminating service in the peering model, (2) enhanced terminating services in the peering model, (3) enhanced originating services in the peering model, and (4) roaming service in the subscription and peering models. The existing solutions and limitations are described generally below.

(1) The NGN interconnected to an NGCN in the peering model is defined as the trunking home NGN. The trunking home NGN is configured as the initial destination for all terminating requests to an NGCN user. The trunking home NGN receiving a request for an NGCN user must somehow retarget terminating SIP requests to the NGCN. The originating network forwards a SIP request to the trunking home NGN as a result of the DNS (Domain Name System) query, which identifies the trunking home NGN as the target for the request. Since the NGCN does not register on behalf of its users with the NGN in the peering model, it is unclear how the NGN can retarget the request to the NGCN. Existing approaches involve the use of SIP proxies to retarget such a request to the NGCN based on provisioned data.

Another possibility is to configure a private DNS within the NGN to retarget the request to the NGCN. Neither approach scales well if there are a significant number of interconnected NGCNs. Either way, the NGN must have special routing procedures and provision special routing data for each NGCN interconnection. It would be preferable if the IMS NGN could instead use generic IMS procedures driven by provisioned subscriber data to perform the request retargeting in an easily scalable manner.

(2) To provide enhanced terminating services in the peering model, in addition to the procedure in item 1 above, the NGN would have to also provision a special application server in the routing path of terminating requests to provide enhanced services for these requests. So at least two entities would need to be provisioned on the routing path for each NGCN interconnection. Since fixed application servers would need to be allocated to provide these terminating services, it is difficult to reuse application servers interconnected via standard IMS interfaces, and there is less ability to assign traffic to application servers as usage and the number of interconnected NGCNs grows.

(3) By configuring the trunking home NGN as the next destination for all originating requests from the NGCN in the peering model, the NGN can provide basic transit/routing services to the NGCN user. But to provide enhanced originating services to this NGCN user, the NGN would have to also provision a special application server in the routing path of originating requests to provide enhanced services for these requests. Since fixed application servers would need to be allocated to provide these originating services, it is difficult to reuse application servers interconnected via standard IMS interfaces, and there is less ability to assign traffic to application servers as usage and the number of interconnected NGCNs grows.

(4) For roaming NGCN users, the visited NGN is defined as the network into which the NGCN user is roaming, and to which the NGCN user is directly connected. When attempting to register for service, the NGCN user sends its registration request via the visited NGN to the registrar name provisioned in the device. The roaming home NGN is defined as the registrar for the NGCN user and the network to which registration requests from the NGCN user are first routed by the visited NGN. The visited NGN forwards a SIP registration request to the roaming home NGN as a result of DNS, which identifies the roaming home NGN as the SIP registrar. Analogously to item 1 above, the roaming home NGN must somehow retarget SIP registration requests to the NGCN to gain access to services provided by the NGCN. Existing approaches to forwarding the SIP registration request from the roaming home NGN to the NGCN involve the use of SIP proxies to retarget such a request to the NGCN based on provisioned data. Another possibility is to configure a private DNS within the NGN to retarget the request to the NGCN. Neither approach scales well if there are a significant number of interconnected NGCNs. Either way, the NGN must have special routing procedures and provision special routing data for each NGCN interconnection. It would be preferable if the IMS NGN could instead use generic IMS procedures driven by provisioned subscriber data to perform the request retargeting in an easily scalable manner. If the NGCN also registers on behalf of its users to the trunking home NGN, as in the subscription model, it is also not clear how to distinguish between registration requests from the visited NGN and the NGCN.

The present invention contemplates a new and improved method that resolves the above-referenced difficulties and others.

SUMMARY OF THE INVENTION

The disclosed invention defines an architecture and the procedures by which an NGN can provide the following capabilities to an NGCN user:

Basic terminating service in the peering model: An NGN is configured among the external networks to receive all SIP requests intended for the NGCN users of an NGCN interconnected to the NGN via the peering model (this NGN is the trunking home NGN), and the NGN forwards these requests to the NGCN for handling in an easily scalable manner using request retargeting driven by provisioned subscriber data and small modifications to existing IMS procedures.

Enhanced terminating services in the peering model: An NGN is configured among the external networks to receive all SIP requests intended for the NGCN users of an NGCN interconnected to the NGN via the peering model, and the NGN applies a set of agreed services using NGN ASs (application servers) to each request before forwarding to the NGCN for handling. By routing requests to an S-CSCF before retargeting to the NGCN, the S-CSCF can use provisioned unregistered filter criteria to access the application servers providing the terminating services based on existing IMS procedures.

Enhanced originating services in the peering model: The NGCN is configured to forward all originating requests to an NGN (the trunking home NGN) via the peering model. The NGN allocates an S-CSCF for NGCN users provisioned for originating services and forwards the originating requests to the S-CSCF so that it can use provisioned unregistered filter criteria to access the application servers providing the originating services based on existing IMS procedures. The provisioning of data for the NGCN users and forwarding to the S-CSCF for services is performed in an easily scalable manner based on provisioned subscriber data and small modifications to existing IMS procedures.

Roaming service in the subscription and peering models: An NGN is configured among the external networks as the roaming home NGN to receive a SIP REGISTER request from an NGCN user that has roaming capability. While the NGCN associated with the NGCN user may be interconnected to the trunking home NGN via the peering model or the subscription model, the NGCN is interconnected to the roaming home NGN only via the peering interface (inter-IMS). The roaming home NGN may or may not be the same as the trunking home NGN, regardless of which model is used to interconnect the trunking home NGN. When the NGCN user attempts to roam to this NGN or another NGN (the visited NGN), the visited NGN forwards the received SIP registration request from the NGCN user device to the roaming home NGN, and the roaming home NGN then forwards the registration request to the NGCN and establishes a path between the NGCN user and the NGCN for handling of subsequent originating and terminating requests. The NGN forwarding of the registration request is performed in an easily scalable manner using request retargeting driven by provisioned subscriber data and small modifications to existing IMS procedures.

In accordance with an aspect of the invention, a method of providing call terminating service in a Next Generation Network (NGN) is provided. The method comprises: assigning to each user in a Next Generation Corporate Network (NGCN) a public user identity (PUID) that is known to a trunking home NGN and has a domain assigned to the trunking home NGN; and provisioning each public user identity (PUID) assigned to an NGCN user within a subscriber database with an alternate contact, wherein the alternate contact is an address for an NGCN server to which the NGCN user registers.

In accordance with another aspect of the invention, the method of providing call terminating service further comprises: receiving a terminating request for a PUID; sending a query to the subscriber database using the PUID of the NGCN user; determining whether the trunking home NGN shall provide originating or terminating services to the PUID and whether the PUID is associated with any other private identity. Where the trunking home NGN shall not provide originating or terminating services to the PUID and the PUID is not associated with any other private identity, an alternate contact is forwarded in a response to an Interrogating Call Session Control Function (I-CSCF). Next, a determination is made as to whether an alternate contact for the PUID has been included in the response and where an alternate contact has been included in the response, the terminating request is forwarded to the alternate contact.

In accordance with yet other aspect of the invention, the method of providing enhanced call terminating services may further comprise: the trunking home NGN assigning an entry point into itself for a terminating request to an NGCN user where this entry point is the same entry point used for a terminating request to a subscriber of the same NGN. Optionally, the profile data for the PUID may include a forwarding option, which is an indication of whether a Call Session Control Function is to use loose-routing or retargeting when forwarding requests to the alternate contact. Also, the method may include: where the trunking home NGN shall provide originating or terminating services to the PUID, forwarding Serving Call Session Control Function (S-CSCF) information in a response to an Interrogating Call Session Control Function (I-CSCF), forwarding the request to the S-CSCF, downloading a profile for the PUID, forwarding the request to any application servers identified by filter criteria to apply appropriate terminating services; and forwarding the terminating request to the alternate contact via loose routing or retargeting.

In accordance with yet another aspect of the invention, a method of providing enhanced call originating service in a Next Generation Network (NGN) is provided. The method comprises: assigning to each user in a Next Generation Corporate Network (NGCN) a public user identity (PUID) that is known to a trunking home NGN and has a domain assigned to the trunking home NGN; and provisioning a subscriber database with an originating services flag associated with the PUID of each NGCN user whose NGCN is interconnected via a peering model and who is to receive enhanced originating services.

In accordance with yet another aspect of the invention, the method of providing enhanced call originating service further comprises: receiving an originating request from an NGCN user having a PUID; and determining whether the originating request is a candidate for originating services according to local policy. Where the originating request is a candidate for originating services, a query is sent to a subscriber database using the PUID of the NGCN user. The originating services flag for the PUID is forwarded in a response to an Interrogating Call Session Control Function (I-CSCF); and where the response also includes Serving Call Session Control Function (S-CSCF) information for the PUID, the request is forwarded to the appropriate S-CSCF. The trunking home NGN may be an IMS providing enhanced originating services to an NGCN user according to a peering model. Also, the local policy may specify that all originating requests are candidates, that all originating requests received at a specific IBCF or I-CSCF are candidates, or that all requests from a specific NGCN server are candidates.

In accordance with yet another aspect of the invention, a method of providing roaming service for a user in a Next Generation Network (NGN) is provided. The method comprises: assigning to each of user in a Next Generation Corporate Network (NGCN) a Session Internet Protocol (SIP) registrar name whose domain is assigned within a public Domain Name System (DNS) to a roaming home NGN; and provisioning each public user identity (PUID) assigned to an NGCN user with roaming capability within a database with an alternate registrar, wherein the alternate registrar contains the address at which the NGCN server can be reached with registration requests.

In accordance with yet another aspect of the invention, the method of providing roaming service further comprises: receiving a registration request for a PUID; determining whether the PUID has roaming capability. Where the PUID has roaming capability, an alternate registrar instead of Serving Call Session Control Function (S-CSCF) data is forwarded in a response. The registration request is forwarded to the alternate registrar instead of an S-CSCF. The method may further comprise populating SIP path and service route headers so that subsequent originating and terminating requests follow the same path between the NGCN and the roaming user. In addition, the same domain may resolve to the NGCN itself within the NGCN private DNS to enable the NGCN user to register for services from its NGCN when not roaming and a roaming home NGN may be an IMS that assigns an entry point into itself for SIP registration requests from roaming NGCN users in visited NGNs into which they roam and the entry point is the same one used by roaming NGN users.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

It is expected that most NGCNs will use an NGN as the interface to external networks to provide these roaming, originating and terminating services. By having a single NGN as the interface to external networks, the NGCN can leverage a single trust relationship with its NGN to establish a transitive trust relationship with all of the external networks with which its NGN has trust relationships, according to the IMS trust model. Thus the NGCN can benefit from the identity assertion, header filtering, traffic control, routing and other services that its NGN can offer via transitive trust relationships with other NGNs that the NGCN would otherwise have to realize on its own. In addition to the benefits of the trust relationship with an NGN, the NGCN also receives IP based trunking services, such as interconnect to the PSTN and other peering SIP networks, routing of 8xx and LNP (local number portability) calls, etc.

Figure 1:
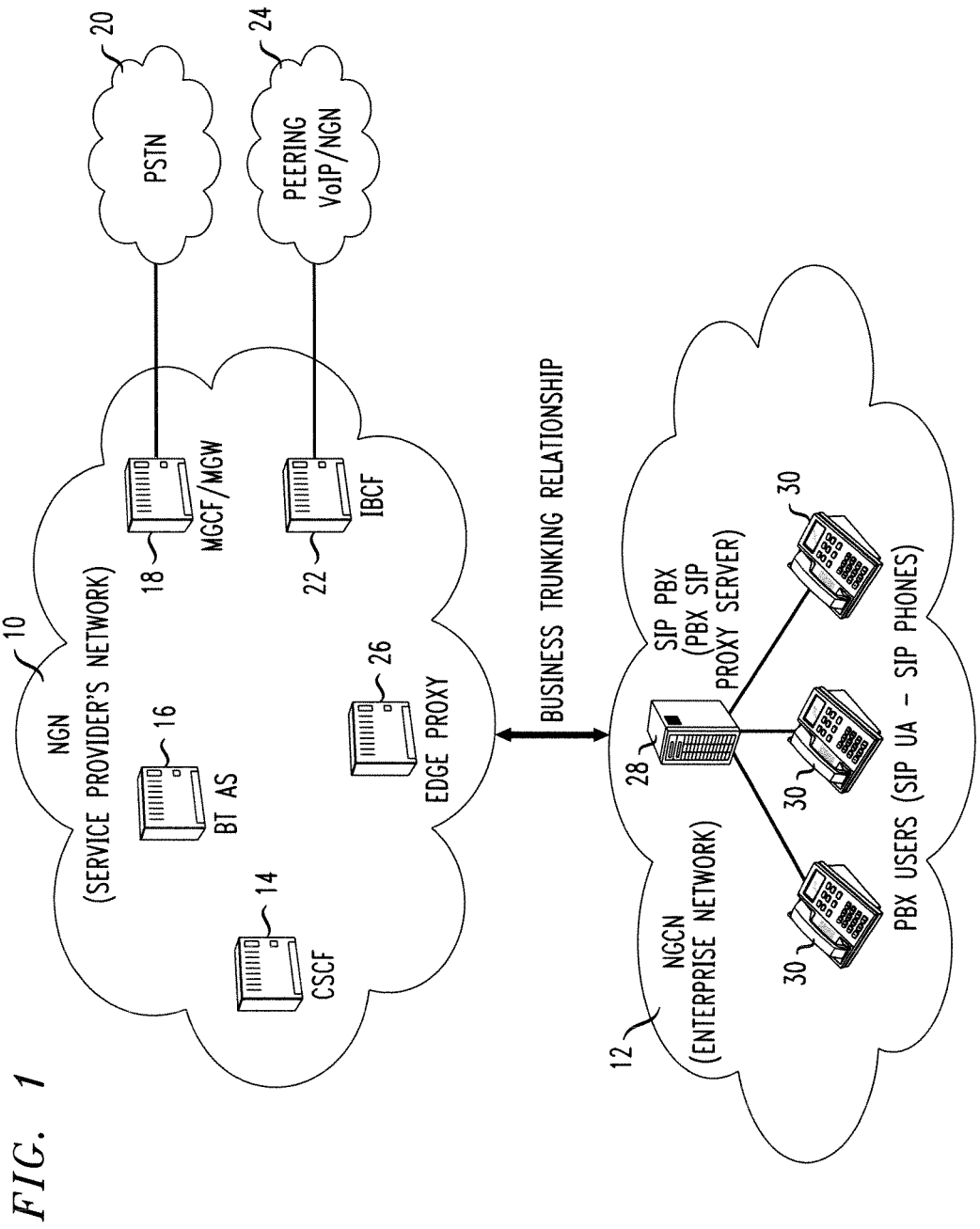
FIG. 1 is a diagram of the business trunking reference architecture.

Referring now to the drawings wherein the showings are for purposes of illustrating the exemplary embodiments only and not for purposes of limiting the claimed subject matter, FIG. 1 provides a view of a system into which the presently described embodiments may be incorporated. As shown generally, FIG. 1 includes an NGN 10 (Service Provider's Network) and an NGCN 12 (Enterprise Network). The NGN 10 includes a set of SIP Servers known as Call Session Control Function (CSCF) 14, a Business Trunking (BT) Application Server (AS) 16, a Media Gateway Control Function/Media Gateway (MGCF/MGW) 18 connected to the Public Switched Telephone Network (PSTN) 20, an IBCF 22 connected to the Peering VoIP/NGN 24, and an Edge SIP Server 26 connected to the NGCN 12. The NGCN 12 includes a SIP PBX 28 (acting as a SIP Proxy Server) and any number of PBX users 30 (SIP phones, acting as SIP User Agent (UA)).

The CSCF 14 is a central component to signaling and control within the IMS network. Subdivided into three separate parts, the CSCF is responsible for signaling via Session Initiation Protocol (SIP) between the Transport Plane, Control Plane, and the Application Plane of IMS. The CSCF consists of the Proxy CSCF (P-CSCF), Interrogating CSCF (I-CSCF), and the Serving CSCF (S-CSCF).

The business trunking interface (a.k.a. SIP trunking interface) between the SIP PBX 28 and the Edge SIP Server 26 provides the business trunking connectivity and services to the NGCN 12. In this view, the NGN 10 is the Trunking Home network for the NGCN 12.

Two models are supported over the Business Trunking interface:

In the subscription model, the Edge SIP Server 26 plays the role of a Proxy-Call Session Control Function (P-CSCF). The SIP PBX 28 registers with the NGN on behalf of the PBX users 30. Calls originated from the NGCN 12 to a public network are forwarded to the Edge SIP Server 26 by the SIP PBX 28. Calls terminated from a public network to the NGCN 12 are routed by the Edge SIP Server 26 to the SIP PBX 28.

In the peering model, the Edge SIP Server 26 plays the role of an IBCF. The SIP PBX 28 does not register with the NGN. Calls originated from the NGCN 12 to a public network are forwarded to the Edge SIP Server 26 by the SIP PBX 28. Calls terminated from a public network to the NGCN 12 are routed by the Edge SIP Server 26 to the SIP PBX 28.

When being served within the Enterprise network 12, the SIP phones 30 register with the PBX 28.

The PBX SIP Proxy Server 28 appears as an NGN user to the NGN/IMS 10. The PBX SIP Proxy Server 28 differs from the "normal" UE in following aspects: (a) it handles many PBX phones; (b) it originates and terminates calls on behalf of PBX phones; and (c) it may register on behalf of PBX phones.

PBX Directory Numbers (DN) that have Direct-In-Dialing ability are assigned with an IMS Public User Identity (PUID), or wild-carded PUID to cover a contiguous range of DNs.

Figure 2:
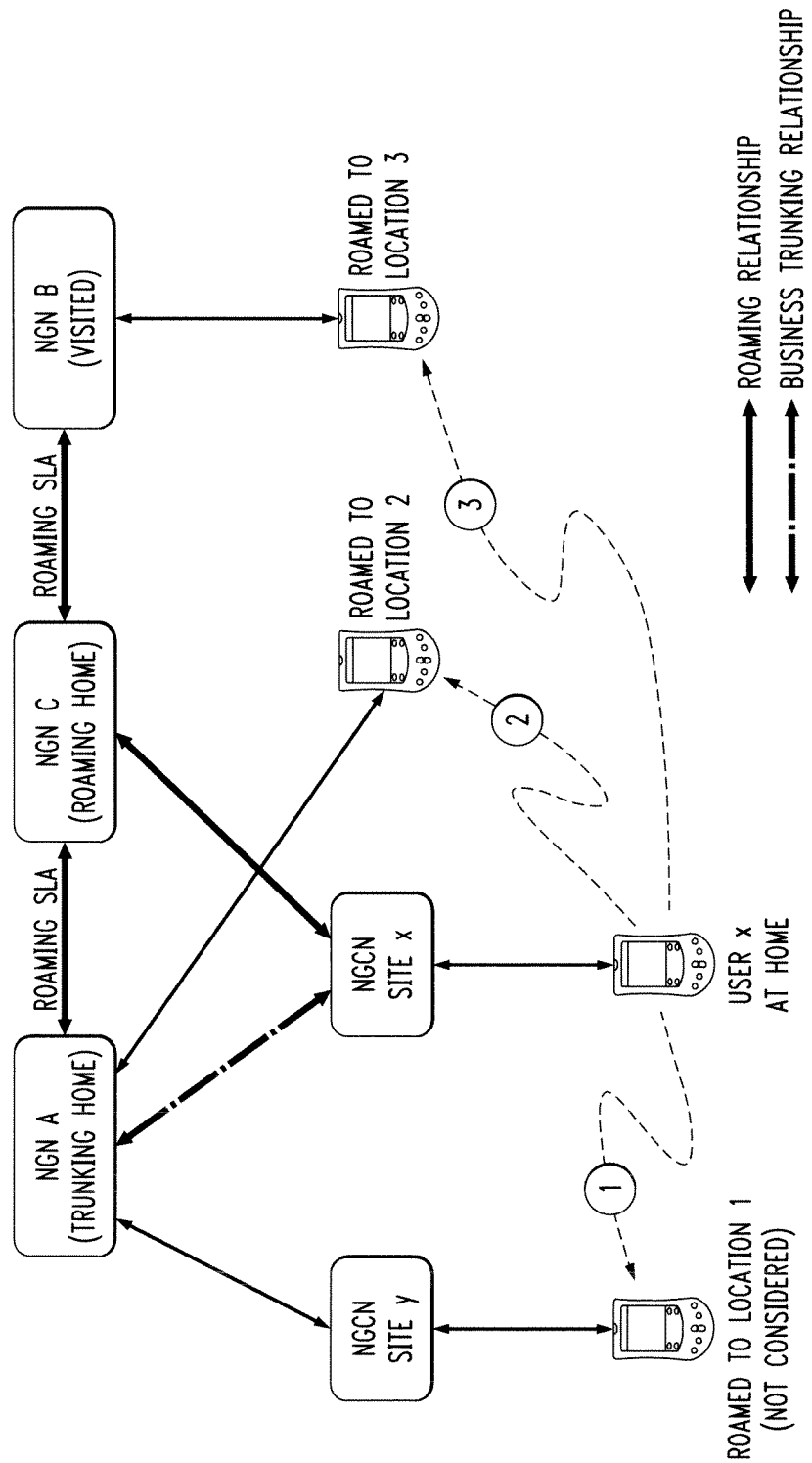
FIG. 2 illustrates NGCN user roaming scenarios.

To enable service while outside the Enterprise network 12, several NGCN roaming scenarios for PBX user X are illustrated in FIG. 2:

1. PBX User X roams to NGCNy connected to trunking home NGN A (not considered);
2. PBX User X roams to trunking home NGN A, which has an SLA (service level agreement) with NGN A;
3. PBX User X roams to a visited NGN B, which has an SLA with NGN A; and
4. PBX User X roams to roaming home C (not shown in figure).

In scenarios 2, 3 and 4, NGCN User X (a.k.a. PBX User X), while roaming in NGN A, B or C, respectively, must be able to register with its home NGCN to receive services from its home NGCN.

Now, let us take the capabilities noted earlier one at a time.

Figure 3:
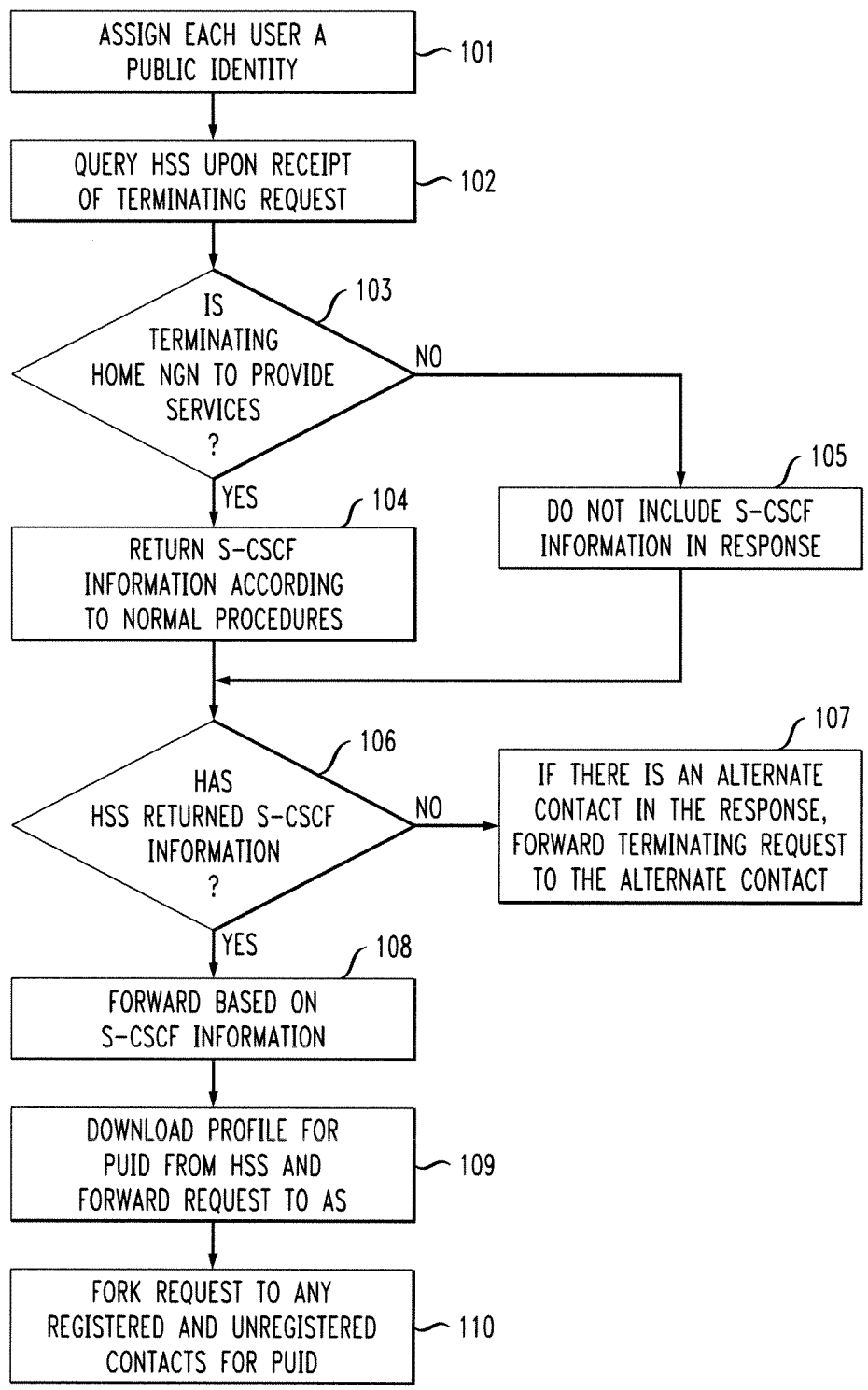
FIG. 3 is a flowchart describing the provision of basic and enhanced terminating NGN services to NGCN users in the peering model.

Referring to FIG. 3, in the first case (basic call terminating service in the peering model) and the second case (enhanced terminating services in the peering model), the NGCN assigns to each of its users a public identity that is known to the trunking home NGN and has a domain assigned to the trunking home NGN (101). The trunking home NGN assigns an entry point into itself for a terminating request to an NGCN user. This entry point is the same entry point used for a terminating request to a subscriber of the same NGN (the I-CSCF or IBCF).

Following standard IMS procedures upon receipt of a terminating request, the I-CSCF queries the HSS with the contents of the Request-URI (102).

According to a new procedure, the HSS determines whether the trunking home NGN shall provide originating or terminating services to the PUID (or wildcard PUID) corresponding to the Request-URI and whether the PUID is associated with any other private identity (i.e., the PUID is shared) (103). If the HSS determines that the trunking home NGN shall provide services to the PUID or that the PUID is associated with any other private identity, then the HSS will include S-CSCF information in the response to the I-CSCF according to normal procedures (i.e., the response includes either the name of an S-CSCF assigned to the PUID or criteria by which to select an S-CSCF) (104). The HSS determines that the NGN shall provide services to the PUID if either originating or terminating unregistered filter criteria are provisioned for the PUID. The HSS must consider both originating and terminating services because it cannot distinguish between queries received in this procedure and the one received in FIG. 4. Otherwise, according to a new procedure, the HSS will not return S-CSCF information but will instead return an alternate-contact in the response to the I-CSCF, if this new piece of HSS data is provisioned as an element of the profile data associated with the PUID or wildcard PUID associated with the Request-URI. The alternate-contact is an address for the NGCN server to which the NGCN user registers. Optionally, the profile data in the HSS may also include a forwarding-option, which is an indication of whether CSCFs are to use loose-routing or retargeting when forwarding requests to the alternate-contact. If present, the HSS will also return the forwarding-option in the response to the I-CSCF.

According to a new procedure, the I-CSCF determines whether the HSS has returned S-CSCF information or an alternate-contact in its response (106). If the I-CSCF determines the HSS has returned no S-CSCF information but has included an alternate-contact in its response, then the I-CSCF forwards the terminating request to the alternate-contact (optionally routing the request via an IBCF according to standard IMS routing procedures) (107).

Two options (loose-route or retarget) can be used by the I-CSCF to forward the terminating request to the alternate-contact, based on either local policy or the forwarding-option received from HSS. In the case of loose-routing, the I-CSCF will populate a Route header with the alternate-contact, with the option to route via an IBCF, leaving the Request-URI intact. In the case of retargeting, the I-CSCF will rewrite the host portion of the Request-URI with the alternate-contact.

When the NGCN server (alternate-contact) receives the terminating request, it performs any provisioned services and forwards it to the registered NGCN user according to normal procedures. The NGCN user may be registered within the NGCN or while roaming in another network. That concludes this branch of the procedure, supporting only the first case (basic call terminating service in the peering mode).

Otherwise, if the HSS returns S-CSCF information to the I-CSCF according to normal procedure, the I-CSCF forwards the request to the assigned S-CSCF (108).

Also according to normal procedures, the S-CSCF downloads the profile for the PUID from the HSS (if it has not already been downloaded) and forwards the request to any application servers identified by filter criteria, to apply appropriate terminating services (109). After all application servers have been visited by the request and if no call diversion service has been applied to the request, the S-CSCF then normally forks the request to any registered contacts for the PUID, although this normal procedure is modified as follows.

According to a new procedure, the profile downloaded by the S-CSCF will include the alternate-contact, which is understood to be an unregistered contact for the PUID. The alternate-contact is an address for the NGCN server to which the NGCN user registers. Optionally, the profile data in the HSS may include a forwarding-option, which is an indication of whether CSCFs are to use loose-routing or retargeting when forwarding requests to the alternate-contact. The profile may also include a q value for the alternate-contact so that it can be assigned a relative priority for forking compared to registered contacts for the PUID.

The S-CSCF then forks the request to registered contacts and the unregistered contact (the alternate-contact) (110). As a special case, if there are no registered contacts, the S-CSCF just forwards the request to the alternate-contact. Two options (loose-route or retarget) can be used by the S-CSCF to forward the terminating request to the unregistered contact (alternate-contact), based on either local policy or the forwarding-option in the profile. In the case of loose-routing, the S-CSCF will populate a Route header with the alternate-contact, with the option to route via an IBCF, leaving the Request-URI intact. In the case of retargeting, the S-CSCF will rewrite the host portion of the Request-URI with the alternate-contact.

When the NGCN server (alternate-contact) receives the terminating request, it performs any provisioned services and forwards it to the registered NGCN user according to normal procedures. The NGCN user may be registered within the NGCN or while roaming in another network. That concludes this branch of the procedure, supporting both the first case (basic call terminating service in the peering mode) and the second case (enhanced terminating services in the peering model).

With small changes to existing IMS procedures, this invention allows for application of services and/or proper routing of terminating requests to the NGCN based only on provisioned subscriber data in a highly scalable manner.

Figure 4:
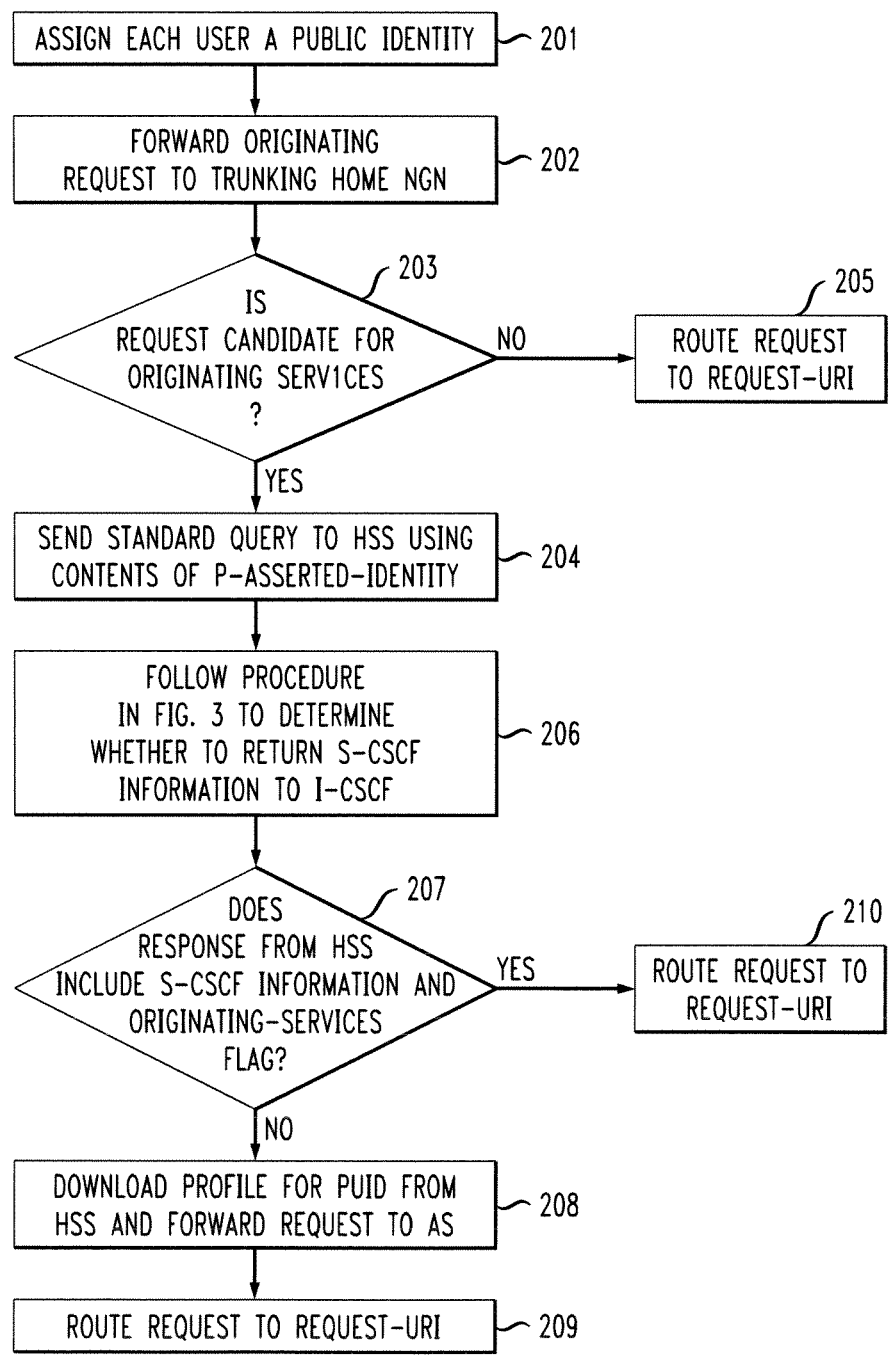
FIG. 4 is a flowchart describing the provision of enhanced originating NGN services to NGCN users in the peering model.

Referring now to FIG. 4, in the third case (enhanced originating services in the peering model), the NGCN assigns to each of its users a public identity that is known to the trunking home NGN (201). The trunking home NGN is an IMS providing enhanced originating services to the NGCN user according to the peering model, and may also provide terminating services to the NGCN user.

The NGCN user generates an originating request while registered within the NGCN or while roaming in another network and sends it to the NGCN server. The NGCN may apply provisioned services before forwarding the request to the trunking home NGN via the standard peering (inter-IMS) interface to the NGN IMS (to an I-CSCF optionally via an IBCF) (202).

Upon receipt of the originating request, according to a new procedure, the I-CSCF determines if the request is a candidate for originating services according to local policy (203). Policy may specify, for example, that all originating requests are candidates, that all originating requests received at a specific IBCF or I-CSCF are candidates, or that all requests from a specific NGCN server are candidates. If the I-CSCF determines that the request is a candidate for originating services, it sends a standard query to the HSS using the contents of the P-Asserted-Identity (the identity of the calling party) (204).

Otherwise, if the I-CSCF determines that the request is not a candidate for originating services, it routes the terminating request based on the Request-URI (205).

According to a new procedure, the HSS may be provisioned with an originating-services-flag as a new element of the profile data associated with the PUID or wildcard PUID associated with the P-Asserted-Identity. This flag is provisioned in the HSS for each subscriber whose NGCN is interconnected via the peering model and who is to receive enhanced originating services. Upon receipt of the query from the I-CSCF, the HSS 1) follows the procedure already defined within FIG. 3 to determine whether to return S-CSCF information to the I-CSCF, 2) includes an originating-services-flag in the response if it is provisioned in the HSS for the PUID, and 3) returns the response to the I-CSCF (206). Note that the HSS does not know the purpose of the query and may return the originating-services-flag under other conditions (e.g., for terminating requests), in which case it is ignored.

According to a new procedure, if the response from the HSS includes S-CSCF information and also includes the originating-services-flag, then the I-CSCF forwards the request to the assigned S-CSCF (207). The I-CSCF includes the "orig" parameter (an existing IMS parameter) in the forwarded request to indicate to the S-CSCF that originating services are to be applied.

According to normal procedures, the S-CSCF downloads the profile for the PUID from the HSS (if it has not already been downloaded) and forwards the request to any application servers identified by unregistered filter criteria, to apply appropriate originating services (208). After all application servers have been visited by the request, the S-CSCF forwards the request to the Request-URI (called party) (209). That concludes this branch of the procedure, supporting the third case (enhanced originating services in the peering model).

Otherwise, if the response from the HSS either does not include S-CSCF information or does not include the originating-services-flag, then the I-CSCF begins normal I-CSCF procedures to route the request based on the Request-URI (210).

With small changes to existing IMS procedures, this invention allows for application of enhanced originating services for NGCN users interconnected via the peering model based only on provisioned subscriber data in a highly scalable manner.

Figure 5:
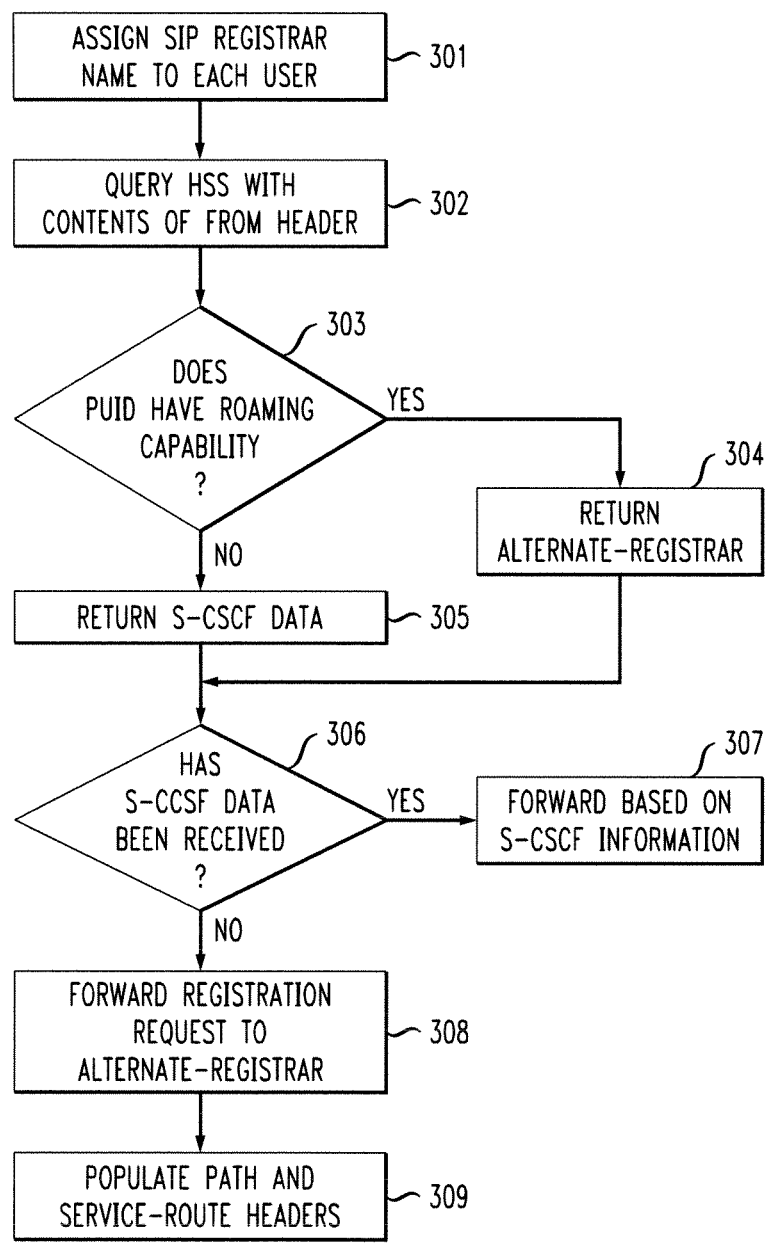
FIG. 5 is a flowchart describing the provision of roaming NGN service to NGCN users.

Referring now to FIG. 5, in the fourth case (roaming service in the subscription and peering models), the NGCN assigns to its users a SIP registrar name whose domain is assigned within public DNS to the roaming home NGN (301). This same domain resolves to the NGCN itself within the NGCN private DNS to enable the NGCN user to register for services from its NGCN when not roaming. The roaming home NGN is an IMS that assigns an entry point into itself for SIP registration requests from roaming NGCN users in visited NGNs into which they roam. This entry point is the same one used by roaming NGN users.

Following standard IMS procedures upon receipt of a registration request, the I-CSCF in the NGN queries the HSS with the contents of the registering AoR (address of record or PUID in the From header) (302).

According to a new procedure, each public identity assigned to a NGCN user with roaming capability is provisioned within the HSS with an alternate-registrar. The alternate-registrar contains the address at which the NGCN server can be reached with registration requests.

Since there is a potential for conflict between SIP registration requests from roaming NGCN users and registration requests directly from the NGCN (in the case where the NGCN using the subscription model may register on behalf of its users with the NGN), the HSS must be able to distinguish between these cases. The NGCN and NGN may, for example, assign unique PUIDs or PUID types to distinguish these cases.

According to a new procedure, upon receipt of the query from the I-CSCF for a public identity associated with the NGCN, the HSS determines whether the public identity has roaming capability (303). If so, then the HSS is provisioned to return the alternate-registrar (the NGCN server address) instead of S-CSCF data (304).

Otherwise, if the HSS instead receives a query from the I-CSCF for a public identity without roaming capability, the HSS is provisioned to return S-CSCF data according to normal procedures (305).

Next, the I-CSCF determines whether it has received S-CSCF data or the alternate-registrar from the HSS in response (306). In the event the I-CSCF receives S-CSCF data, it follows normal procedures to forward the request to the S-CSCF (307). This is the case of normal NGN UE registration. Otherwise, if the I-CSCF receives the alternate-registrar from the HSS according to a new procedure, the I-CSCF forwards the registration request to the alternate-registrar instead of an S-CSCF (308).

According to a new procedure, the alternate-registrar and certain IMS nodes on the path need to populate the SIP path and service-route headers correctly so that subsequent originating and terminating requests follow the same path between the NGCN and the roaming UE (309).

With small changes to existing IMS procedures, this invention allows the roaming home NGN to properly route registration requests from roaming NGCN users to the NGCN based only on provisioned subscriber data in a highly scalable manner.

The main advantage is that the terminating, originating and roaming scenarios listed above can be supported efficiently via small changes in provisioned subscriber data and via small enhancements to generic IMS procedures. Without this new solution, one would need to dedicate new functional entities to the specific routing and header manipulation tasks required in these scenarios. This default approach does not scale up as well when supporting many NGCNs.

FIGS. 6-13 illustrate call flow diagrams to help further describe the operation of the exemplary methods described above. Like reference numerals apply to similar network elements throughout the various call flows.

Figure 6:
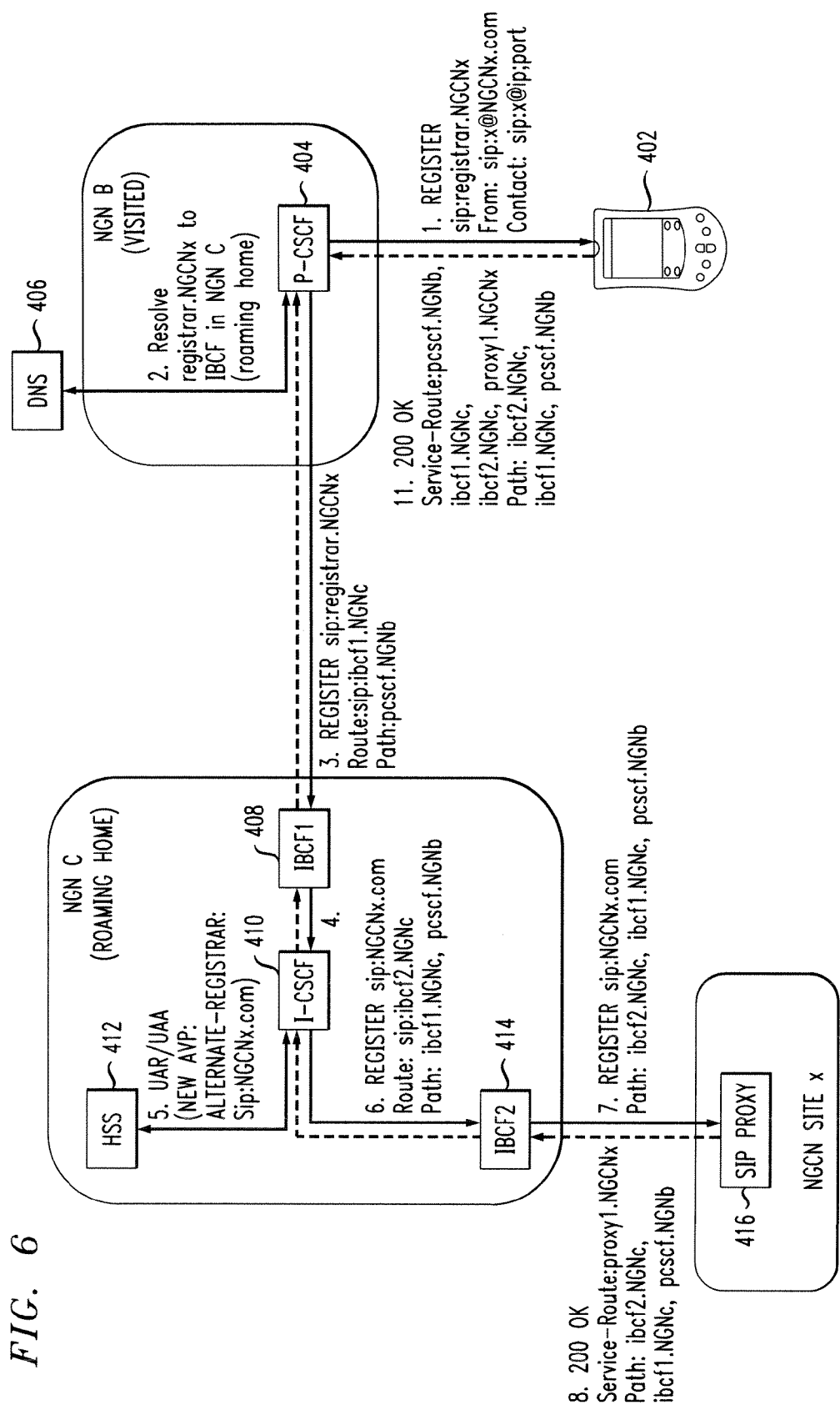
FIG. 6 illustrates a call flow for a Register request from an NGCN user that is roaming to another NGN.

As an example of the roaming procedure described in FIG. 5, FIG. 6 illustrates a registration call flow from an NGCN user (402) that is roaming in a visited NGN (NGN B). The roaming user 402 needs to register with the SIP Proxy server 416 in its home NGCN in order to continue receiving the same set of services as when it is at home (not roaming).

While roaming into a visited NGN B, the NGCN user 402 follows the standard IMS procedure to discover a P-CSCF 404 in the visited NGN B. The NGCN user 402 sends the SIP REGISTER request to the P-CSCF 404 (step 1). The SIP registrar name in the Request-URI is assigned by its home NGCN. Within the public DNS, the assigned SIP registrar name resolves to an entry node—the IBCF 408—in the roaming home NGN (NGN C) (steps 2 & 3). (The same domain name resolves to the NGCN itself within the NGCN private DNS to enable the NGCN user to register for services from its NGCN when not roaming.) Following the existing IMS procedure, the IBCF 408 forwards the request to the I-CSCF 410 (step 4), which then performs Cx query with HSS 412 (step 5) to determine where to route the request. In accordance with aspects of the present invention (as shown in FIG. 5), NGN C (roaming home) is provisioned in the HSS 412 with an Alternate-Registrar for NGCN user 402 that has roaming capability. Also, the Cx UAA query is enhanced to return the Alternate-Registrar for NGCN user with roaming capability (step 5). For NGCN users without roaming capability, the HSS 412 returns the S-CSCF name as usual in the Cx UM message. The I-CSCF 410 is enhanced to rewrite the Request-URI using the Alternate-Registrar and forwards the Register request to the SIP Proxy server 416, traversing IBCF 414 (steps 6 & 7). Enhancing the existing IMS registration procedure, each SIP stateful proxy server, P-CSCF 404, IBCF 408 and IBCF 414, inserts itself in the Path header, which will be used by the SIP Proxy server 416 to construct the terminating route and to forward terminating calls to the roaming user 402, traversing IBCF 414, IBCF 408, and P-CSCF 404.

The SIP Proxy server 416 (acting as the SIP registrar) processes the REGISTER request, establishes the binding for the roaming user 402, and sends 200 OK to the roaming user 402 for successful registration. While traversing the SIP servers, each SIP stateful server, the SIP Proxy server 416, IBCF 414, IBCF 408, and P-CSCF 404, inserts itself in the Service-Route header in the 200 OK response. The Service-Route header will be used by the roaming user 402 to construct the Route header when it originates a call to ensure the call will be routed to the SIP Proxy server 416. Optionally, SUBSCRIBE/NOTIFY of registration event may be used to allow the SIP Proxy server 416 (the SIP registrar) to notify the SIP servers (IBCF 414, IBCF 408 and P-CSCF 404) and the roaming user 402 when the user 402 registration status (e.g., network-initiated deregistration) changes.

Figure 7:
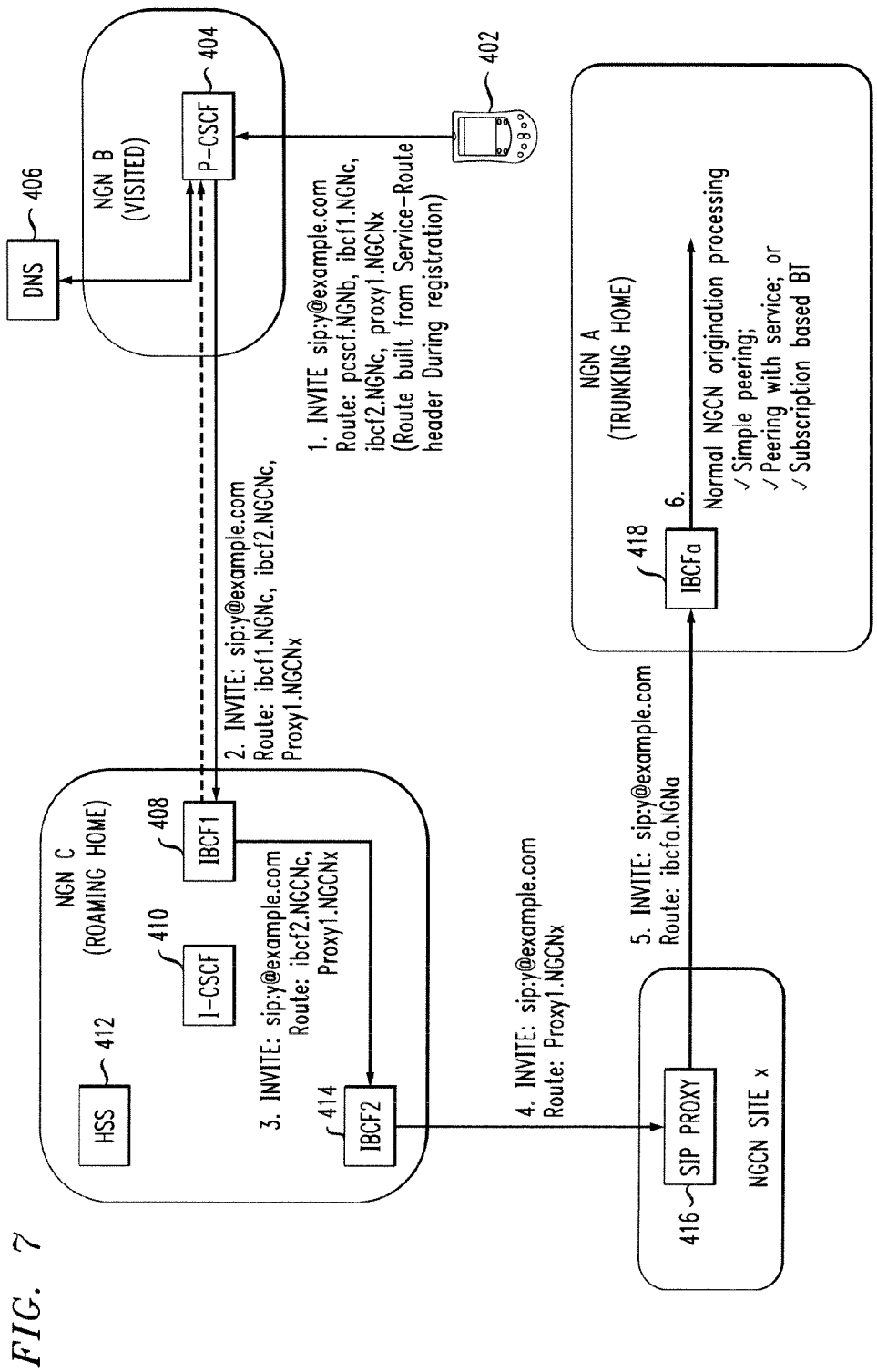
FIG. 7 illustrates a call flow for call origination from an NGCN user roaming to another NGN.

To demonstrate how a roaming NGCN user originates a request, FIG. 7 illustrates a call flow for call origination from an NGCN user (402) roaming to a visited NGN (NGN B). As a result of successful registration (shown in FIG. 6), the roaming user 402 constructs the Route header from the Service-Route header received in the 200 OK (REGISTER) response. Following standard IMS procedure, the INVITE request will be sent using the Route header and will traverse the P-CSCF 404, IBCF 408 and IBCF 414, and reach the SIP Proxy server 416 in the home NGCN. The SIP Proxy server 416 will then follow the normal call origination procedure and forward the request to the entry IBCF 418 in the trunking home NGN A. This allows the roaming user 402 to receive the same set of originating services as when it is not roaming.

Figure 8:
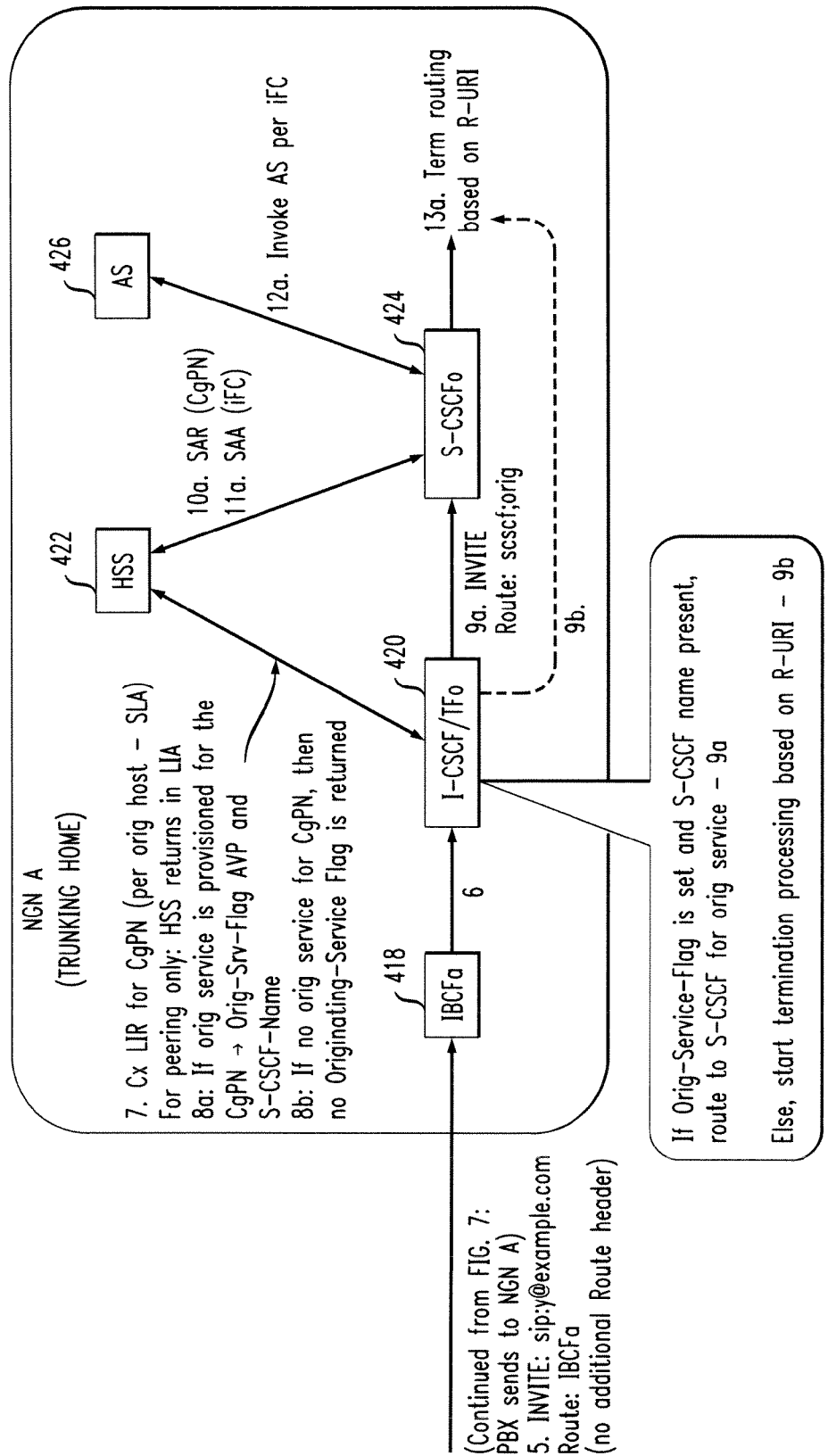
FIG. 8 illustrates a call flow for normal NGCN origination for peering-based business trunking.

As an example of the origination procedure of FIG. 4, FIG. 8 illustrates a call flow for normal NGCN origination for peering-based business trunking. It is applicable both when a NGCN user is at home (not roaming) and when a NGCN user is roaming. For the roaming case, FIG. 8 is a continuation from FIG. 7.

When an NGCN user originates a call, the SIP Proxy Server 416 forwards the INVITE request to the entry point—the IBCF 418—in the trunking home NGN (NGN A). Each NGCN is assigned with a trunking home NGN. The IBCF 418 forwards the request to the I-CSCF 420. In accordance with aspects of the present invention, the I-CSCF 420 invokes the Cx LIR query to the HSS 422 for the calling party (step 8). The calling party Cx query is invoked based on local policy, either for every call, or per NGCN determined by the Service Level Agreement (SLA). A new AVP, originating-services-flag, is included in the response when the Public User Identity (PUID) in the Cx LIR query has originating services provisioned in the HSS 422.

If originating services are provisioned for the PUID received in the Cx LIR query, then the HSS 422 responds with the originating-services-flag and the S-CSCF name (step 8a) in the Cx LIA response, else the originating-services-flag is not included in the response (step 8b).

If the originating-services-flag is present and the S-CSCF name is present, then the I-CSCF 420, performing origination processing, forwards the request to the S-CSCF 424 for originating services (step 9a). In steps 10a-12a, the S-CSCF 425 follows the standard IMS procedure and invokes originating services for the calling party. If the originating-services-flag is not present, the I-CSCF 420 starts normal termination processing based on the Request-URI (step 9b).

Figure 9:
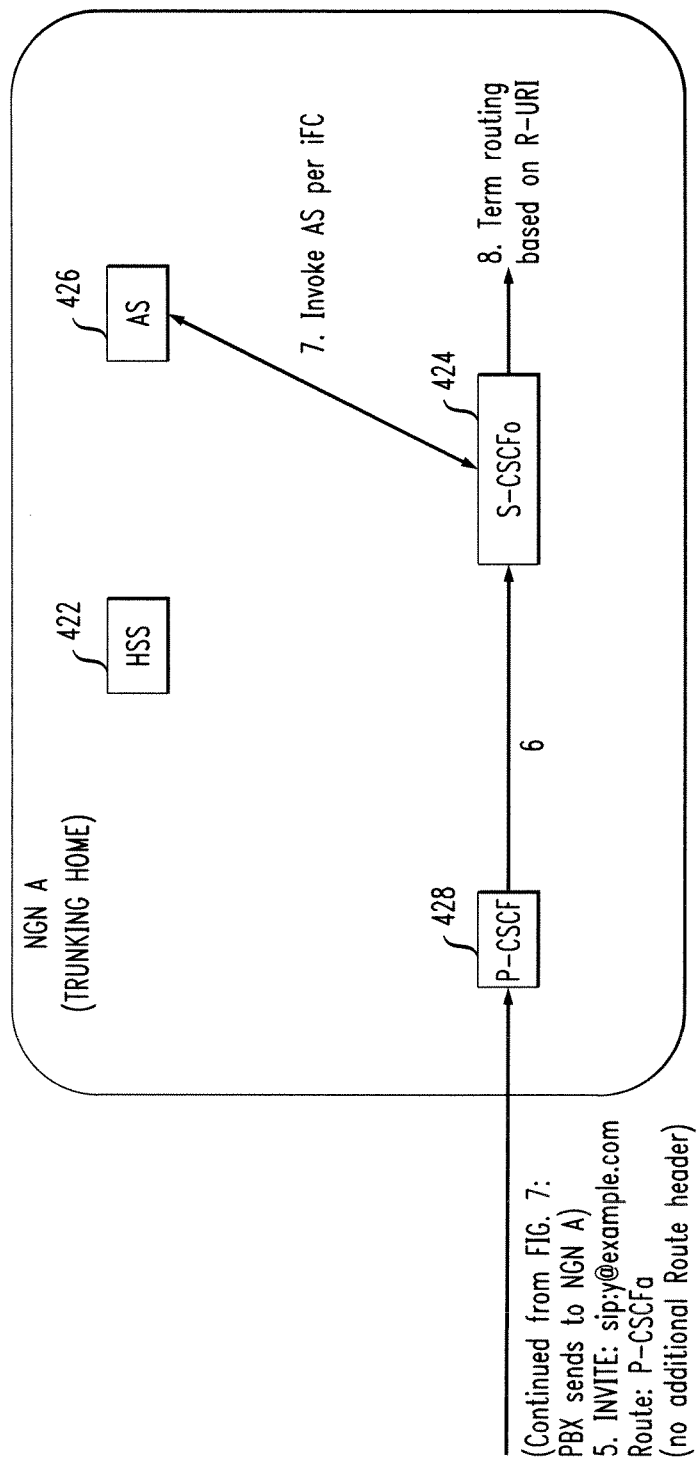
FIG. 9 illustrates a call flow for normal NGCN origination for subscription-based business trunking.

FIG. 9 illustrates a call flow for normal NGCN origination for subscription-based business trunking. Note that for subscription-based business trunking solution, there is no impact to the existing operation. For NGCN users that are "subscription based," the HSS 422 is not provisioned with Orig-Service-Flag or Alternate-Contact. The call flow is applicable for NGCN users that are at home (not roaming) and for NGCN users that are roaming. For the roaming case, FIG. 9 is a continuation from FIG. 7.

Figure 10:
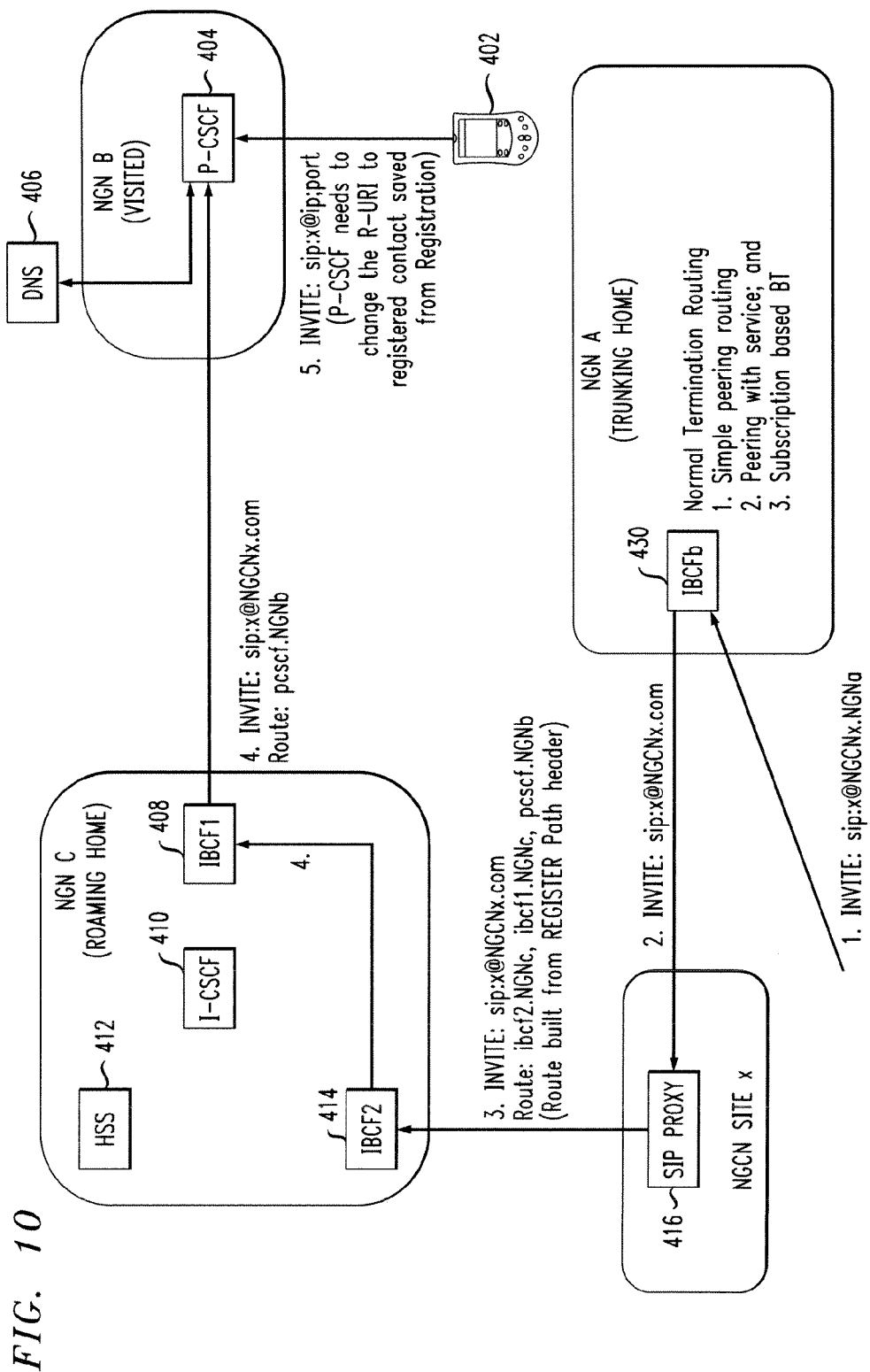
FIG. 10 illustrates a call flow for call termination to an NGCN user that is roaming to another NGN.

To demonstrate how a roaming NGCN user receives a terminating request, FIG. 10 illustrates a call flow for call termination to an NGCN user (402) that is roaming in a visited NGN (NGN B). By definition, a call destined to a NGCN user is first routed to its trunking home NGN A. After the NGN A invokes any IMS terminating services (detailed in FIG. 11-13), it forwards the request to the SIP Proxy server 416, possibly traversing the IBCF 430 (step 2).

The SIP Proxy server 416 (SIP registrar) knows that the terminating party (user 402) is roaming based on the registration process shown in FIG. 6. The SIP Proxy server 416 constructs the Route header using the Path header saved from the registration process and forwards the INVITE to the roaming user 402, traversing IBCF 414, IBCF 408, and P-CSCF 404.

Figure 11:
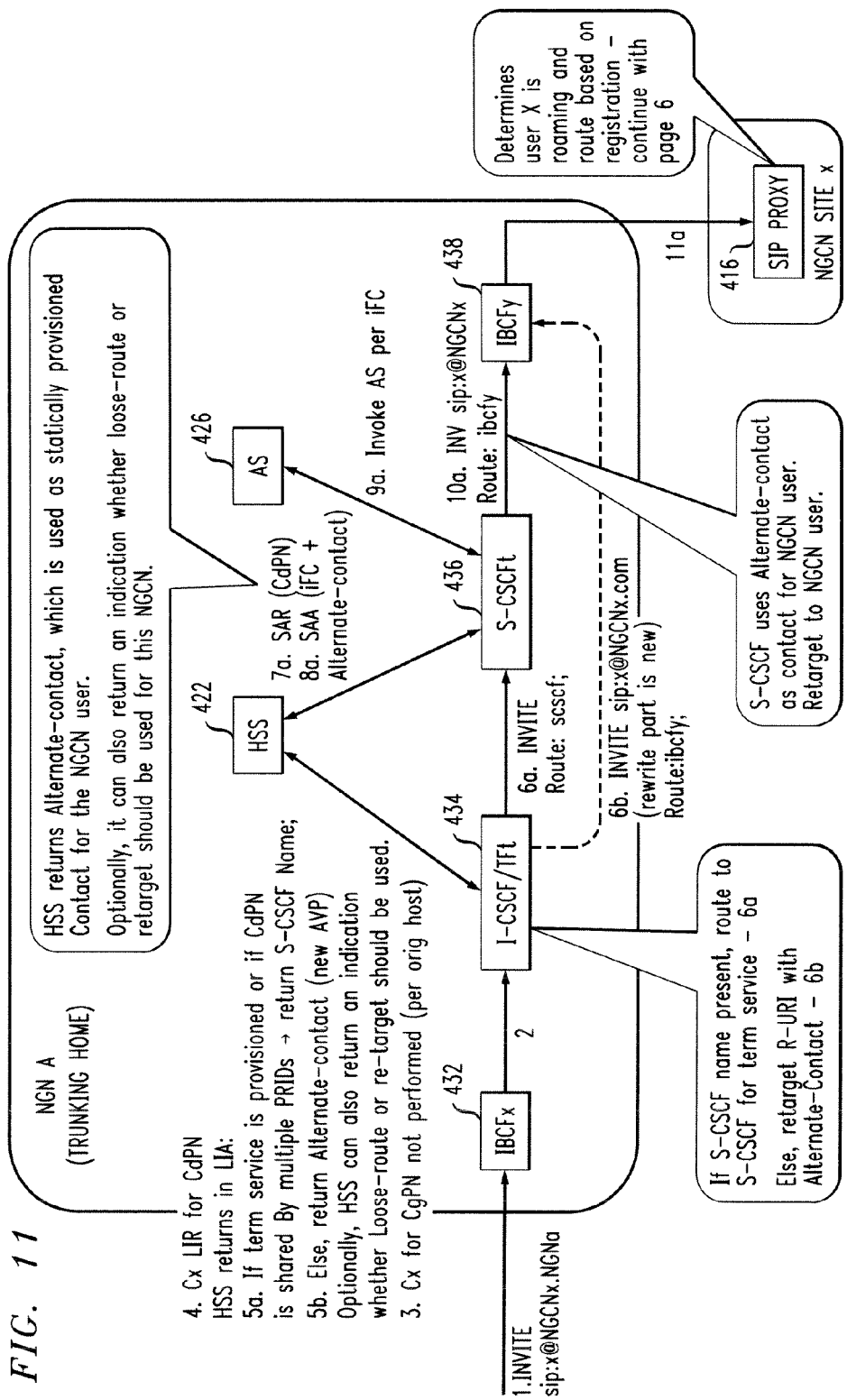
FIG. 11 illustrates a call flow for a first alternative for normal termination to an NGCN user for peering-based business trunking.

As an example of the termination procedure of FIG. 3, FIG. 11 illustrates a call flow for a first alternative for normal termination to an NGCN user for peering-based business trunking (option 1—re-target). The INVITE request arrives at the entry node—IBCF 432—in the trunking home NGN (NGN A) for the terminating party (step 1). Following standard IMS procedure, the IBCF 432 forwards the request to the I-CSCF 434 (step 2), which then performs Cx LIR query to HSS 422 for the called party (step 3). If the HSS 422 is provisioned with unregistered originating or terminating services for the called party (with a public user identity) or if the corresponding public user identity is shared by multiple private user identities, the HSS 422 returns the S-CSCF name (step 5a) in Cx LIA; otherwise, the HSS 422 returns Alternate-Contact in accordance with aspects of the present invention. Optionally, the HSS 422 can also be provisioned to return an indication whether the loose-route or retarget option should be used for termination routing.

In the case where the HSS 422 returns S-CSCF name (step 5a), the I-CSCF 434 follows the standard procedure and forwards the request to the S-CSCF 436. The S-CSCF 436 queries the HSS 422 to download a service profile for the called party (step 7a). The HSS 422 (step 8a) returns the service profile, the Alternate-Contact and optionally an indication whether the loose-route or retarget option should be used for this NGCN user. After invoking services for the called party based on standard procedure (step 9a), the S-CSCF 436 uses the Alternate-Contact received from HSS 422 (from step 8a) to rewrite the Request-URI (retarget option) and forwards the INVITE to the SIP Proxy server 416, traversing IBCF 438 (step 10a and 11a). The S-CSCF 436 chooses the retarget option either according to provisioned policy or due to receipt of a retarget indication from HSS 422.

In the case when the HSS 422 returns an Alternate-Contact (step 5b), the I-CSCF 434 rewrites the Request-URI using the Alternate-Contact (retarget option) and forwards the INVITE to the SIP Proxy server 416, traversing the IBCFy 438 (steps 6b and 11a). The NGCN user receives no enhanced services from the NGN in this case.

Figure 12:
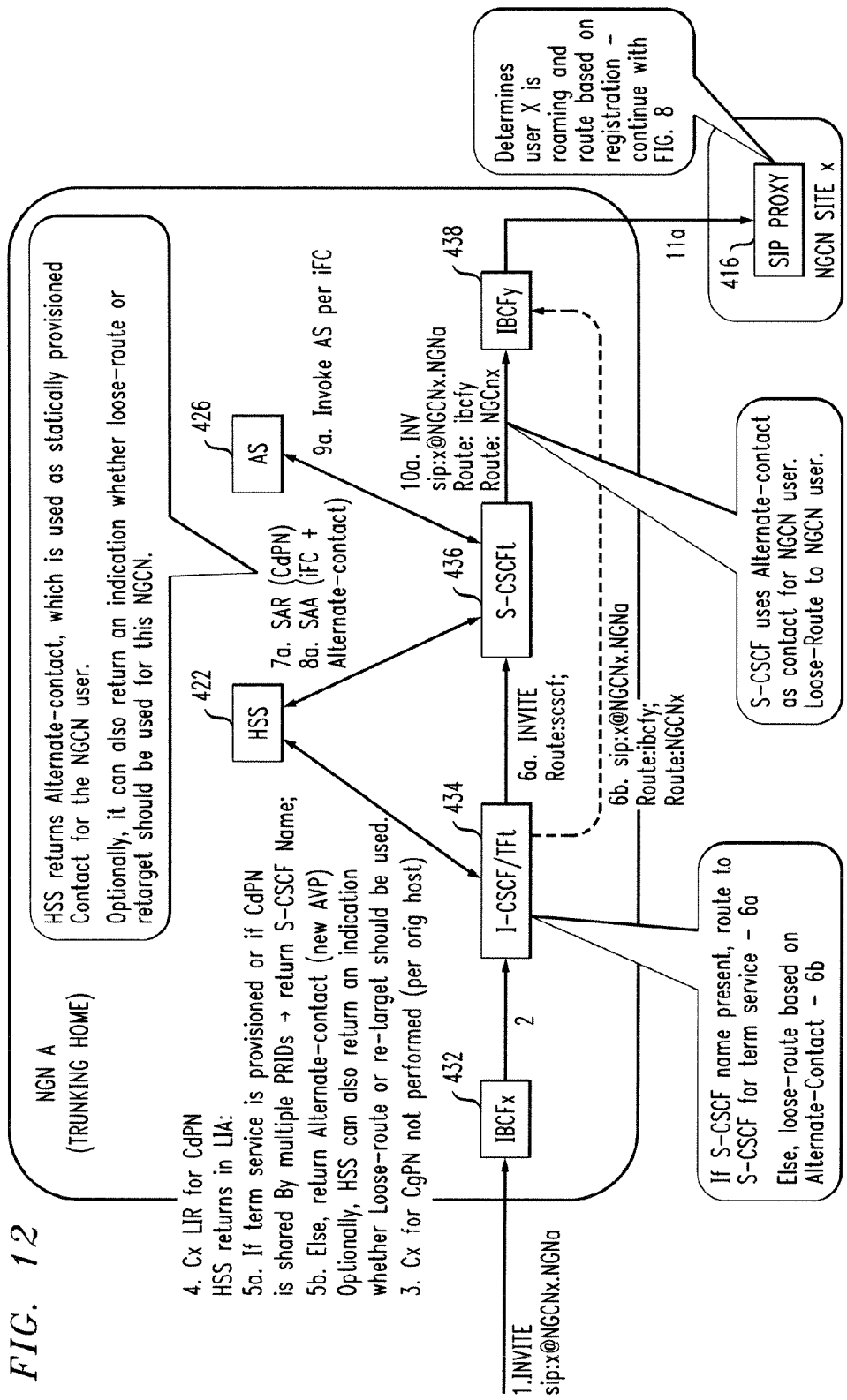
FIG. 12 illustrates a call flow for a second alternative for normal termination to an NGCN user for peering-based business trunking.

As a further example of the termination procedure of FIG. 3, FIG. 12 illustrates a call flow for a second alternative for normal termination to an NGCN user for peering-based business trunking (option 2—loose-route). The procedures are the same as described as in FIG. 12, with the following exceptions. The HSS 422 optionally returns a loose-route indication rather than a retarget indication in step 5b or step 8a. In step 10a the S-CSCF 436 uses the loose-route option: it does not rewrite the Request-URI; instead, it populates two Route headers, the first one is the IBCF 438 and the second the Alternate-Route. Similarly, in step 6b, the I-CSCF 434 uses the loose-route option: it does not rewrite the Request-URI; instead, it populates two Route headers, the first one is the IBCF 438 and the second the Alternate-Route.

Figure 13:
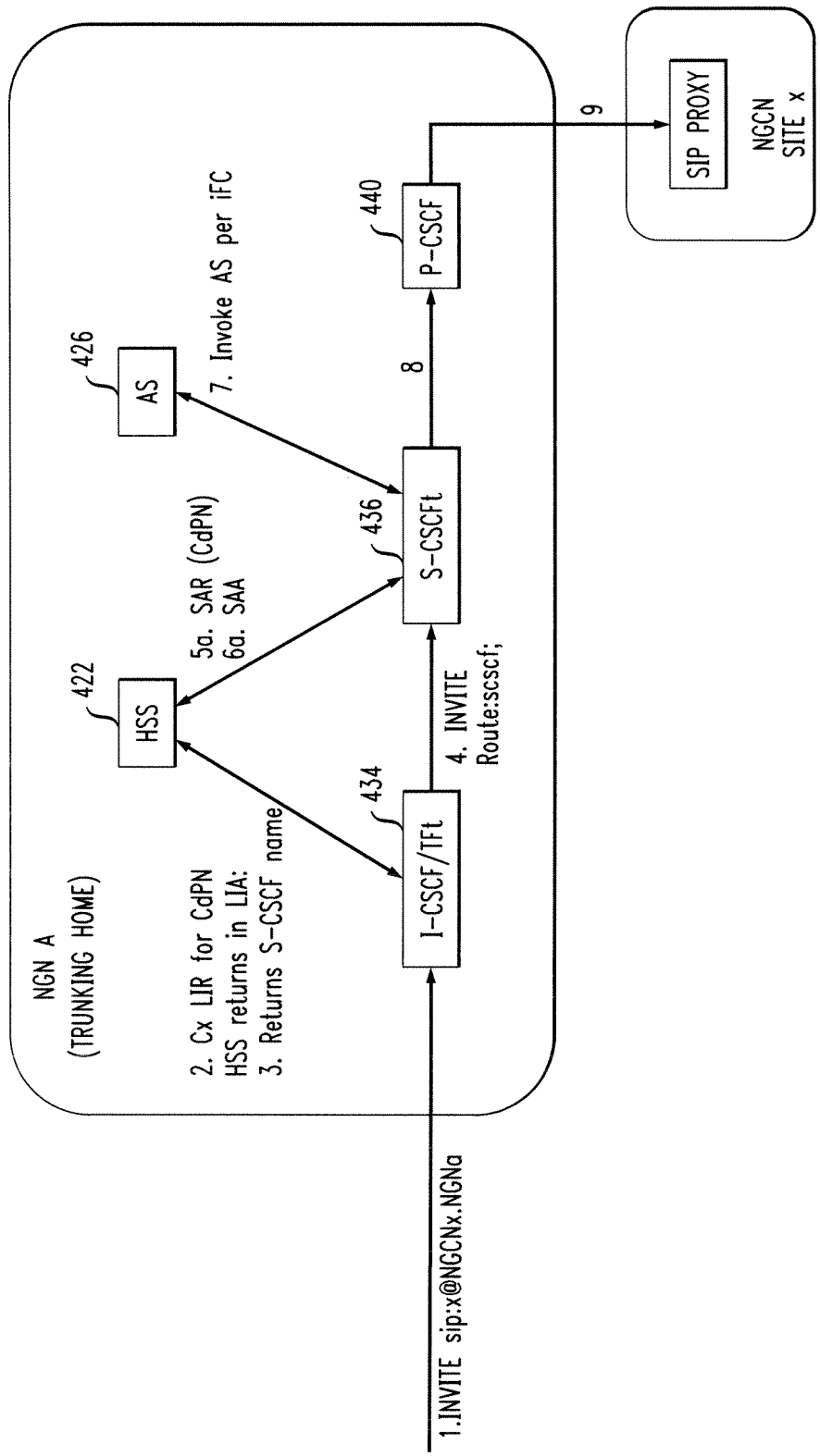
FIG. 13 illustrates a call flow for normal termination to an NGCN user for subscription-based business trunking.

FIG. 13 illustrates a call flow for normal termination to an NGCN user for subscription-based business trunking. Note that for the subscription-based business trunking solution, there is no impact to the existing operation. For NGCN users that are "subscription based," the HSS 422 is not provisioned with an alternate-contact.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of providing call terminating service for a user in a Next Generation Network (NGN), the method comprising:

assigning to each user in a Next Generation Corporate Network (NGCN) a public user identity (PUID) that is known to a trunking home NGN and has a domain assigned to the trunking home NGN;

provisioning each PUID assigned to an NGCN user within a subscriber database with an alternate contact, wherein the alternate contact is an address for an NGCN server to which the NGCN user registers;

receiving a terminating request for a PUID;

sending a query to a subscriber database using the PUID of the NGCN user;

determining whether the trunking home NGN shall provide unregistered terminating services to the PUID or whether the PUID is registered with at least one private identity;

where the trunking home NGN shall provide unregistered terminating services or the PUID is registered with at least one private identity, forwarding Serving Call Session Control Function (S-CSCF) information in a response to an Interrogating Call Session Control Function (I-CSCF);

forwarding the terminating request to the Serving Call Session Control Function (S-CSCF);

accessing a profile for the PUID including alternate contact information for an unregistered contact;

forwarding the terminating request to application servers identified by filter criteria to apply appropriate terminating services; and forking the terminating request to the registered contacts and unregistered contact associated with the PUID, where the unregistered contact is identified by the alternate contact and reached via loose routing or retargeting, wherein loose routing comprises populating a Route header with the alternate contact with the option to route via an IBCF and leaving a Request-URI intact and retargeting comprises rewriting a host portion of a Request-URI with an alternate contact.

2. The method of claim 1, wherein the trunking home NGN assigns an entry point into itself for a terminating request to an NGCN user and this entry point is the same entry point used for a terminating request to a subscriber of the same NGN.

3. The method of claim 1, wherein the profile data for the PUID includes a forwarding option, which is an indication of whether a Call Session Control Function is to use loose-routing or retargeting when forwarding requests to the alternate contact.

4. The method of claim 1, wherein the S-CSCF forwards the terminating request to the alternate contact via loose routing or retargeting.

5. A system for providing call terminating service for a user in a Next Generation Network (NGN), the system comprising:
   a database that stores subscriber data; and
   one or more servers that are operative to:
      assign to each user in a Next Generation Corporate Network (NGCN) a public user identity (PUID) that is known to a trunking home NGN and has a domain assigned to the trunking home NGN;
      provision each PUID assigned to an NGCN user within a subscriber database with an alternate contact, wherein the alternate contact is an address for an NGCN server to which the NGCN user registers;
      receive a terminating request for a PUID;
      send a query to the subscriber database using the PUID of the NGCN user;
      determine whether the trunking home NGN shall provide unregistered terminating services to the PUID or whether the PUID is registered with at least one private identity;
      where the trunking home NGN shall provide unregistered terminating services or the PUID is registered with at least one private identity, forward Serving Call Session Control Function (S-CSCF) information in a response to an Interrogating Call Session Control Function (I-CSCF);
      forward the terminating request to the Serving Call Session Control Function (S-CSCF);
      access a profile for the PUID including alternate contact information for an unregistered contact;
      forward the terminating request to application servers identified by filter criteria to apply appropriate terminating services; and
      fork the terminating request to the registered contacts and unregistered contact associated with the PUID, where the unregistered contact is identified by the alternate contact and reached via loose routing or retargeting, wherein loose routing comprises populating a Route header with the alternate contact with the option to route via an IBCF and leaving a Request-URI intact and retargeting comprises rewriting a host portion of a Request-URI with an alternate contact.

6. The system of claim 5, wherein the trunking home NGN is operative to assign an entry point into itself for a terminating request to an NGCN user and this entry point is the same entry point used for a terminating request to a subscriber of the same NGN.

7. The system of claim 5, wherein the profile data for the PUID includes a forwarding option, which is an indication of whether a Call Session Control Function is to use loose-routing or retargeting when forwarding requests to the alternate contact.

8. The system of claim 5, wherein the S-CSCF is operative to forward the terminating request to the alternate contact via loose routing or retargeting.

* * * * *